(12) United States Patent
Bhasin

(10) Patent No.: US 10,885,537 B2
(45) Date of Patent: Jan. 5, 2021

(54) SYSTEM AND METHOD FOR DETERMINING REAL-TIME OPTIMAL ITEM PRICING

(71) Applicant: Gurpreet Singh Bhasin, Foster City, CA (US)

(72) Inventor: Gurpreet Singh Bhasin, Foster City, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 157 days.

(21) Appl. No.: 16/050,917

(22) Filed: Jul. 31, 2018

(65) Prior Publication Data

US 2020/0043027 A1 Feb. 6, 2020

(51) Int. Cl.
*G06Q 30/02* (2012.01)
*G06Q 30/06* (2012.01)

(52) U.S. Cl.
CPC ..... *G06Q 30/0206* (2013.01); *G06Q 30/0629* (2013.01)

(58) Field of Classification Search
CPC ......... G06Q 10/00; G06Q 40/00; G06Q 40/06
USPC .............................................. 705/3–44, 7.35
See application file for complete search history.

(56) References Cited

U.S. PATENT DOCUMENTS

| | | | | |
|---|---|---|---|---|
| 8,050,976 | B2* | 11/2011 | Staib | G06Q 30/0283 705/26.1 |
| 2002/0199025 | A1* | 12/2002 | Kutay | G06F 8/10 709/250 |
| 2011/0302002 | A1* | 12/2011 | Dance | G06Q 30/0211 705/7.35 |
| 2014/0222506 | A1* | 8/2014 | Frazer | G06Q 30/02 705/7.29 |
| 2015/0127413 | A1* | 5/2015 | Hanafusa | G06F 9/5027 705/7.26 |
| 2016/0321705 | A1* | 11/2016 | Scheidelman | G06F 40/20 |

OTHER PUBLICATIONS

Peter et al "The value of purchase history data in target marketing", 1996, Arizona University, pp. 1-3 (Year: 1996).*
Mohammad et al (Optimal pricing model for electronic products), Feb. 2009, Computers & Industrial Engineering vol. 56, Issue 1; pp. 255-259 (Year: 2009).*

* cited by examiner

*Primary Examiner* — Romain Jeanty
(74) *Attorney, Agent, or Firm* — Loeb & Loeb LLP

(57) ABSTRACT

Transaction data across a plurality of merchants may be analyzed as a data stream in real time to determine an optimal price for a product in real time. Transaction data and product data corresponding to a plurality of purchase transactions for a product of the product data may be stored as the transactions are completed. The product data may include an item identification and an item price and the transaction data may correspond to purchase transactions between a plurality of customer computer systems and a plurality of merchant computer systems. Each purchase transaction may include an item sale price and a merchant identifier. Real-time pricing data may then be determined from a combination of coefficients corresponding to the product data and the transaction data. The item price may be revised for the product based on the pricing data.

20 Claims, 6 Drawing Sheets

SYSTEM AND METHOD FOR DETERMINING REAL-TIME OPTIMAL ITEM PRICING

BACKGROUND

Pricing for goods of any type can be difficult for a merchant. While businesses offering products to the market are usually able to ascertain production and materials costs easily, the perfect price for the item or service, at least for the business, is always the highest that the market will bear. Typically, different merchants will set their price for an item and adjust that price based on sales volume. However no one knows the actual transaction price of a given item in real time. Too, smaller merchants typically do not have enough sales data to determine a true average historical sales price for an item in order to apply or determine an optimal price for the item and compete with larger merchants that have this data.

For example, some merchants employ a dynamic pricing model. A dynamic pricing service offered by Amazon.com, Inc. applies only to merchants and products sold through the Amazon® marketplace. Another past solution was KhiMetrics (by KhiMetrics, Inc.) which was a batch-based, Enterprise class product for pricing. This batch-based analyzed multiple merchants prices manually and then provided a prediction for what the market for the good or service would bear. In all past solutions, only a narrow set of transaction data for a single merchant or ecosystem was available for pricing analysis.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

The present disclosure provides a technical solution to the technical problem of determining a market price for an item in real time. In some embodiments, a plurality of merchant computer systems may pass sales data for an item to a payment network system. The payment network system may analyze this historical sales data from the merchants for the item and determine a real-time optimal price for the item for a present sale. The real-time optimal price may then be passed back to the merchant computer system and used by the merchant to determine a sale price for the item in a present sale. In some embodiments, a pricing algorithm may use a weighted average of prices paid and velocity of sale and prices/velocity of similar items in the same category as a particular good or service. The algorithm may then project future prices as well as past to determine a real-time pricing curve for the good or service. This results in determining pricing based on two factors: 1) what the market has borne and 2) the velocity of market sales. In implementation, the price for the good or service in the merchant's catalog may change automatically without the merchant needing to do anything manually. Further settings may allow the merchant to set lower and/or upper boundaries so that the merchant will not lose money or give the appearance of price gouging in certain circumstances.

In some embodiments, a computer-implemented method may determine a real-time optimal price for a product. The method may store product data and transaction data corresponding to a plurality of purchase transactions for a product of the product data. The product data may include an item identification and an item price. The transaction data may correspond to purchase transactions between a plurality of customer computer systems and a plurality of merchant computer systems. Each purchase transaction may include an item sale price and a merchant identifier. The method may also determine pricing data from a combination of coefficients corresponding to the product data and the transaction data. The item price may then be revised for the product based on the pricing data.

In further embodiments, a system may determine a real-time optimal price for a product. The system may include a processor and memory hosting an weighted price calculation system as well as a database coupled to the processor and the memory. The database may store product data and transaction data corresponding to a plurality of purchase transactions for a product of the product data. The product data may include an item identification and an item price, while the transaction data may correspond to purchase transactions between a plurality of customer computer systems and a plurality of merchant computer systems. Each purchase transaction may include an item sale price and a merchant identifier. The memory may include instructions that are executable by the processor for determining pricing data from a combination of coefficients corresponding to the product data and the transaction data. The memory may also include instructions for revising the item price for the product based on the pricing data.

BRIEF DESCRIPTION OF THE FIGURES

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

DETAILED DESCRIPTION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, components, or devices. Accordingly, the present invention may take the form of an entirely hardware embodiment, an entirely software embodiment, or an embodiment combining software and hardware aspects. The following detailed description is, therefore, not to be taken in a limiting sense.

Figure 1:
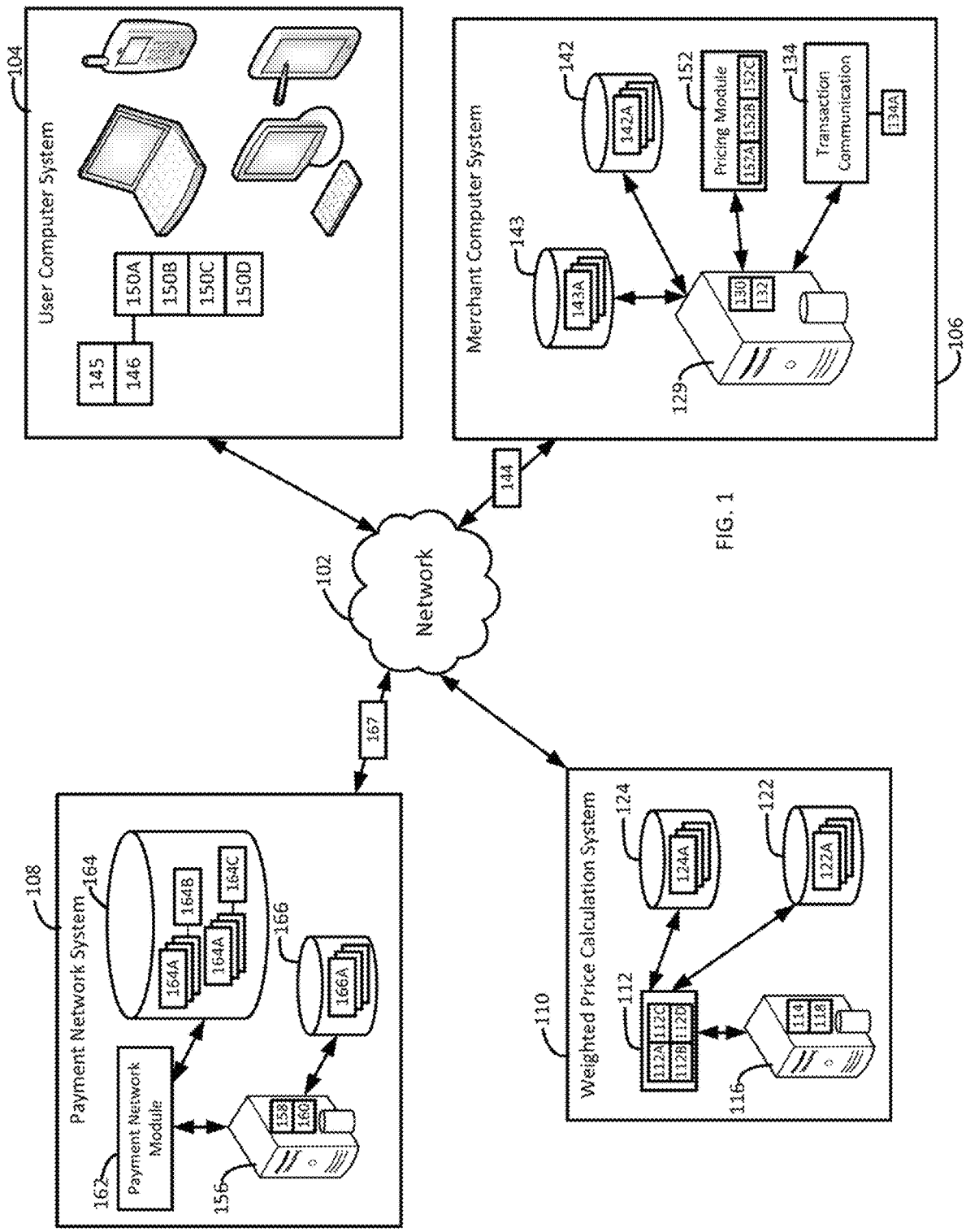
FIG. 1 shows an illustration of an exemplary payment system for determining a real-time optimal price for an item.

FIG. 1 generally illustrates one embodiment of a payment system 100 for determining real-time optimal pricing for a good or service. The system 100 may include a computer network 102 that links one or more systems and computer components. In some embodiments, the system 100 includes a user computer system 104, a merchant computer system 106, a payment network system 108, and an weighted price calculation system 110.

The network 102 may be described variously as a communication link, computer network, internet connection, etc. The system 100 may include various software or computer-executable instructions or components stored on tangible memories and specialized hardware components or modules that employ the software and instructions to identify related transaction nodes for a plurality of transactions by monitoring transaction communications between users and merchants.

The various modules may be implemented as computer-readable storage memories containing computer-readable instructions (i.e., software) for execution by one or more processors of the system 100 within a specialized or unique computing device. The modules may perform the various tasks, methods, blocks, sub-modules, etc., as described herein. The system 100 may also include both hardware and software applications, as well as various data communications channels for communicating data between the various specialized and unique hardware and software components.

Networks are commonly thought to comprise the interconnection and interoperation of hardware, data, and other entities. A computer network, or data network, is a digital telecommunications network which allows nodes to share resources. In computer networks, computing devices exchange data with each other using connections, i.e., data links, between nodes. Hardware networks, for example, may include clients, servers, and intermediary nodes in a graph topology. In a similar fashion, data networks may include data nodes in a graph topology where each node includes related or linked information, software methods, and other data. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications or data network. A computer, other device, set of related data, program, or combination thereof that facilitates, processes information and requests, and/or furthers the passage of information from a source user to a destination user is commonly referred to as a "node." Networks generally facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

A user computer system 104 may include a processor 145 and memory 146. The user computing system 104 may include a server, a mobile computing device, a smartphone, a tablet computer, a Wi-Fi-enabled device or other personal computing device capable of wireless or wired communication, a thin client, or other known type of computing device. The memory 146 may include various modules including instructions that, when executed by the processor 145 control the functions of the user computer system 104 generally and integrate the user computer system 104 into the system 100 in particular. For example, some modules may include an operating system 150A, a browser module 1506, a communication module 150C, and an electronic wallet module 150D. In some embodiments, the electronic wallet module 150D and its functions described herein may be incorporated as one or more modules of the user computer system 104. In other embodiments, the electronic wallet module 150D and its functions described herein may be incorporated as one or more sub-modules of the payment network system 110.

In some embodiments, a module of the user computer system 104 may pass user payment data to other components of the system 100 to facilitate determining a real-time optimal price. For example, one or more of the operating system 150A, a browser module 1506, a communication module 150C, and an electronic wallet module 150D may pass data to a merchant computer system 106 and/or to the payment network system 108 to facilitate a payment transaction for a good or service. Data passed from the user computer system 104 to other components of the system may include a customer name, a customer ID (e.g., a Personal Account Number or "PAN"), address, current location, and other data.

The merchant computer system 106 may include a computing device such as a merchant server 129 including a processor 130 and memory 132 including components to facilitate transactions with the user computer system 104 and/or a payment device 200 (FIG. 2) via other entities of the system 100. In some embodiments, the memory 132 may include a transaction communication module 134. The transaction communication module 134 may include instructions to send merchant messages 134A to other entities (e.g., 104, 108, 110) of the system 100 to indicate a transaction has been initiated with the user computer system 104 and/or payment device 200 including payment device data and other data as herein described. The merchant computer system 106 may include a merchant transaction repository 142 and instructions to store payment and other merchant transaction data 142A within the transaction repository 142. The merchant transaction data 142A may only correspond to transactions for products with the particular merchant or group of merchants having a merchant profile (e.g., 164B, 164C) at the payment network system 108.

The merchant computer system 106 may also include a product repository 143 and instructions to store product data 143A within the product repository 143. For each product offered by the merchant computer system 106, the product data 143A may include a product name, a product UPC code, an item description, an item category, an item price, a number of units sold at a given price, a merchant ID, a merchant location, a customer location, a calendar week, a date, a historical price of the product, and other information related to the product. In some embodiments, the merchant computer system 106 may send merchant payment data corresponding to a payment device 200 (FIG. 2) to the payment network system 108 or other entities of the system 100, or receive user payment data from the user computer system 104 in an electronic wallet-based or other computer-based transaction between the user computer system 104 and the merchant computer system 106.

The merchant computer system 106 may also include a pricing module 152 having instructions to facilitate applying a real-time optimal price to a good or service offered by the merchant computer system 106 to the user computer system 104. In some embodiments, the pricing module 152 may communicate with one or more of the payment network system 108 and the weighted price calculation system 110 to receive pricing data 144 from a backend system (e.g., the weighted price calculation system 110) or to determine the pricing data 144 locally at the merchant computer system 106 via the pricing module 152 and a pricing API 152A. The pricing API 152A may include instructions to access one or more backend components (e.g., the payment network system 108, the weighted price calculation system 110, etc.) and/or the local pricing module 152 to configure a pricing graphical interface 152B to dynamically present and apply the pricing data 144 to products 143A offered by the merchant computer system 106 to the user computer system 104. A merchant historical pricing calculator 152C may include instructions to mine merchant transaction data 143A and calculate a moving price average until the current date to get historical price of the product.

The payment network system 108 may include a payment server 156 including a processor 158 and memory 160. The memory 160 may include a payment network module 162 including instructions to facilitate payment between parties (e.g., one or more users, merchants, etc.) using the payment system 100. The module 162 may be communicably connected to an account holder data repository 164 including payment network account data 164A. The payment network account data 164A may include any data to facilitate payment and other funds transfers between system entities (e.g., 104, 106). For example, the payment network account data 164A may include account identification data, account history data, payment device data, etc. The module 162 may also be communicably connected to a payment network system transaction repository 166 including payment network system global transaction data 166A. The global transaction data 166A may include any data corresponding to a transaction employing the system 100 and a payment device 200 (FIG. 2). For example, the global transaction data 166A may include, for each transaction across a plurality of merchants, data related to a payment or other transaction using a PAN, account identification data, a product name, a product UPC code, an item description, an item category, an item price, a number of units sold at a given price, a merchant ID, a merchant location, a customer location, a calendar week, and a date, corresponding to the product data 143A for the product that was the subject of the transaction. The module 162 may also include instructions to send payment messages 167 to other entities and components of the system 100 in order to complete transactions between users of the user computer system 104 and merchants of the merchant computer system 106 who are both account holders within the payment network system 108.

The weighted price calculation system 110 may include one or more instruction modules including a weighted price calculation module 112 that, generally, may include instructions to cause a processor 114 of a weighted price calculation server 116 to functionally communicate with a plurality of other computer-executable steps or sub-modules, e.g., sub-modules 112A, 112B, 112C, 112D and components of the system 100 via the network 102. These modules 112A, 112B, 112C, 112D may include instructions that, upon loading into the server memory 118 and execution by one or more computer processors 114, dynamically determine pricing data for a product 143A.

A pricing module 112A may include instructions to determine a dynamic price for each product 143A from the global transaction data 166A. In some embodiments, the pricing module 112A may determine pricing by combining a plurality of metrics from the global transaction data 166A. For example, a pricing data 144 for each product 143A may be determined by the formula, which does not use sales volume as a determining factor for the pricing data 144:

Pricing Data=Weighted Sale Price*Historical Coefficient*Similar Price Category Coefficient*Seasonality Coefficient*Sales Velocity Coefficient*Accuracy Coefficient    EQUATION 1

Figure 3:
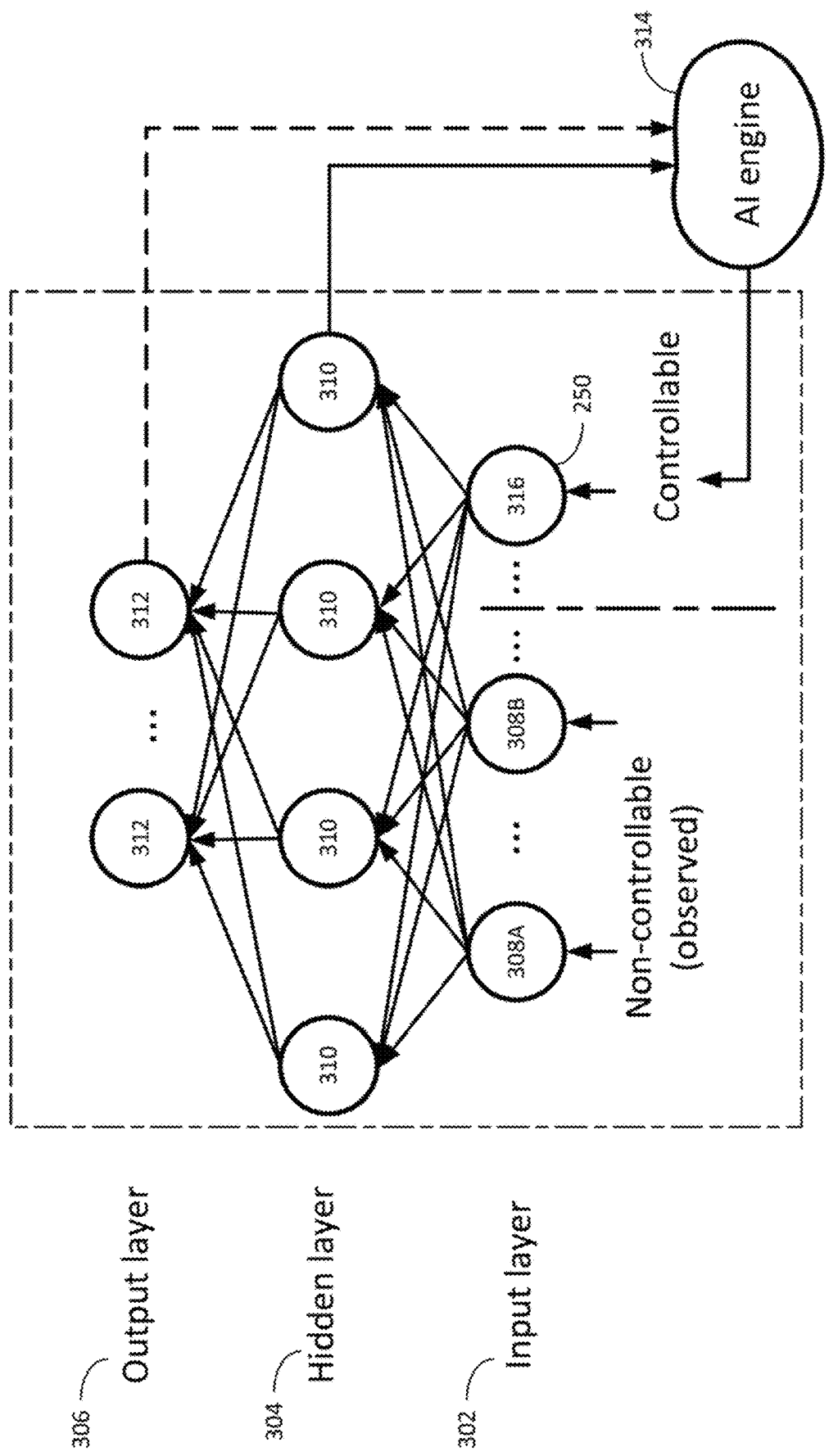
FIG. 3 shows an exemplary machine learning architecture.
Figure 4:
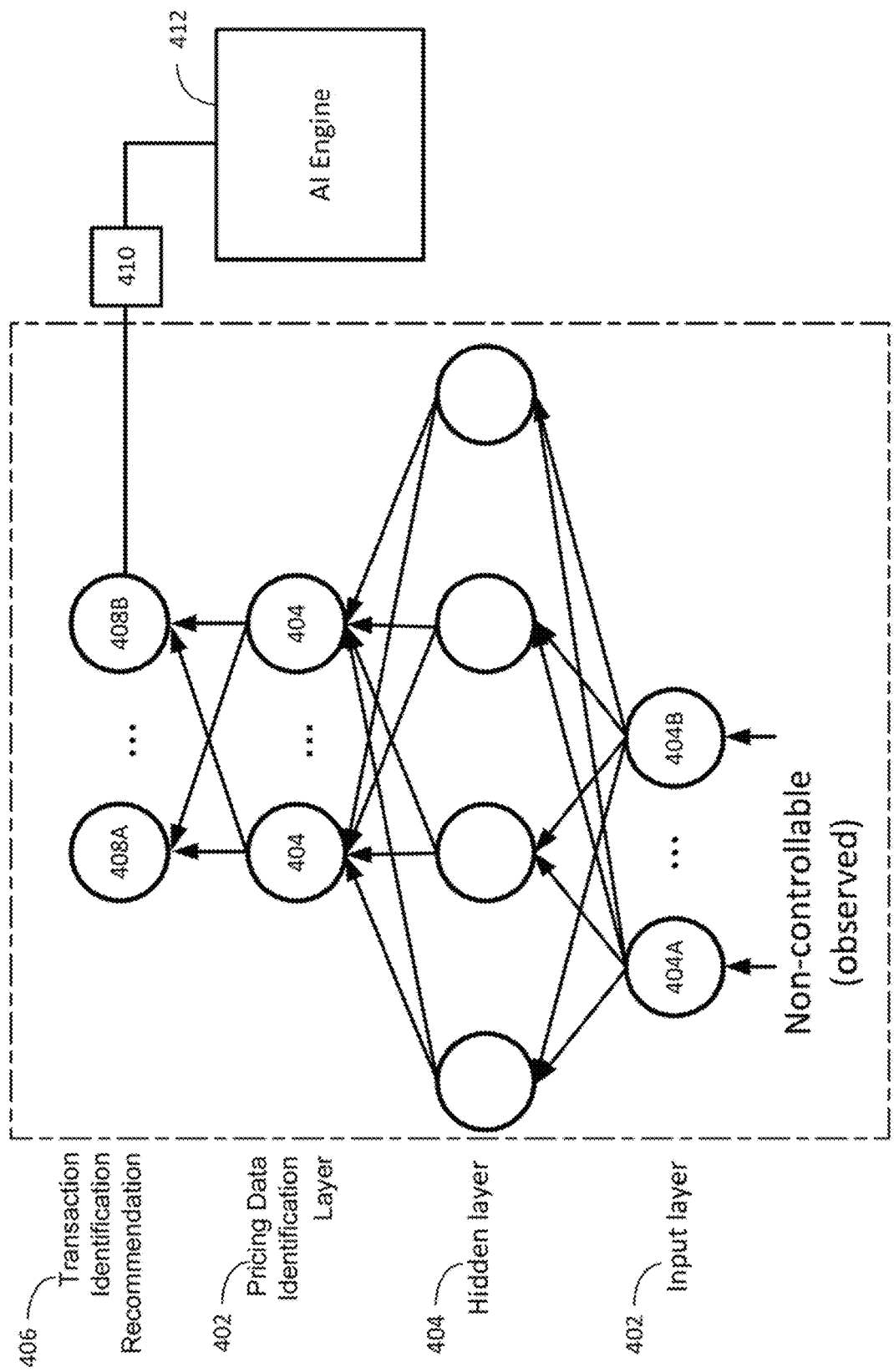
FIG. 4 shows an exemplary artificial intelligence architecture.

In further embodiments, the pricing module 112A may use EQUATION 1 as a guideline only and, with reference to FIGS. 3 and 4, employ artificial intelligence and machine learning techniques to improve the pricing data 144. For example, these Al techniques may be able to grade themselves for accuracy between price prediction and actual sales prices in real time as the global transaction data 166A is processed as a data stream.

Weighted Sale Price may be a combination of a product name, a product UPC code, an item description, an item category, an item price, a number of units sold at a given price, a merchant ID, a merchant location, a customer location, a calendar week, and a date. The Historical Coefficient may be a historical price of the item as determined by the merchant historical price calculator 152C sent from the merchant computer system 106 using local data at the merchant computer system, or determined by a historical price calculator module 112b of the weighted price calculation system 110 using global transaction data 166A from the payment network system. In either case, the historical coefficient may be the result of mining the merchant transaction data 142A and/or the global transaction data 166A to a current transaction date to calculate a moving price average for the product.

The similar price category coefficient may be a numerical value representing how similar a product is to other products having similar characteristics and/or how similar in price one product is to another product. In some embodiments, a similarity module 112C may include instructions to analyze product data 143A to determine the similar price category. For example, the module 112C may include instructions to perform a natural language analysis of one or more of an item description, an item name, and other product data to determine the similar price category coefficient. Alternatively or additionally, the module 112C may include instructions to analyze an item price across a plurality of the product data 143A to determine those products having a similar price.

The seasonality coefficient may be a numerical representation of product sales by season. For example, products typically purchased in summer may have a higher seasonality coefficient when transaction data for the products includes a calendar week or day of the year occurring during the summer. Similarly, the same products typically purchased in summer may have a lower seasonality coefficient when transaction data for the products includes a calendar week or day of the year occurring during the winter. Sales Velocity Coefficient is a numerical value measuring how quickly a product is sold. For example, a higher Sales Velocity Coefficient may indicate a high number of products sold for a given calendar week, day of the year, or other period. An Accuracy Coefficient may be a numerical value measuring how close the pricing data 144 for an item matches the item price for a particular product 143A.

Figure 2A:
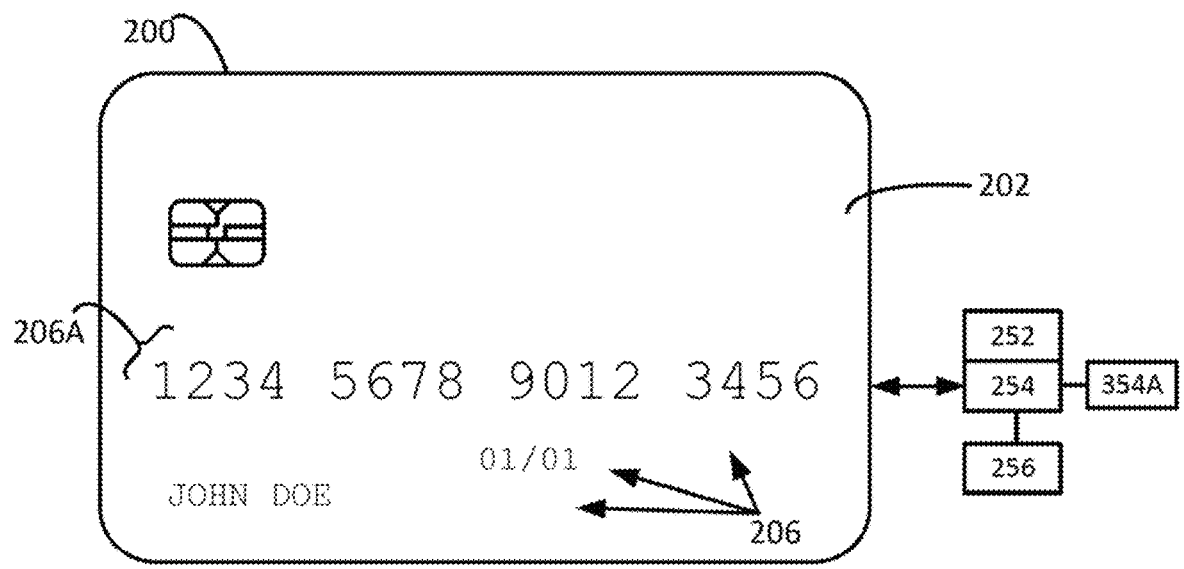
FIG. 2A shows a first view of an exemplary payment device for use with the system of FIG. 1.
Figure 2B:
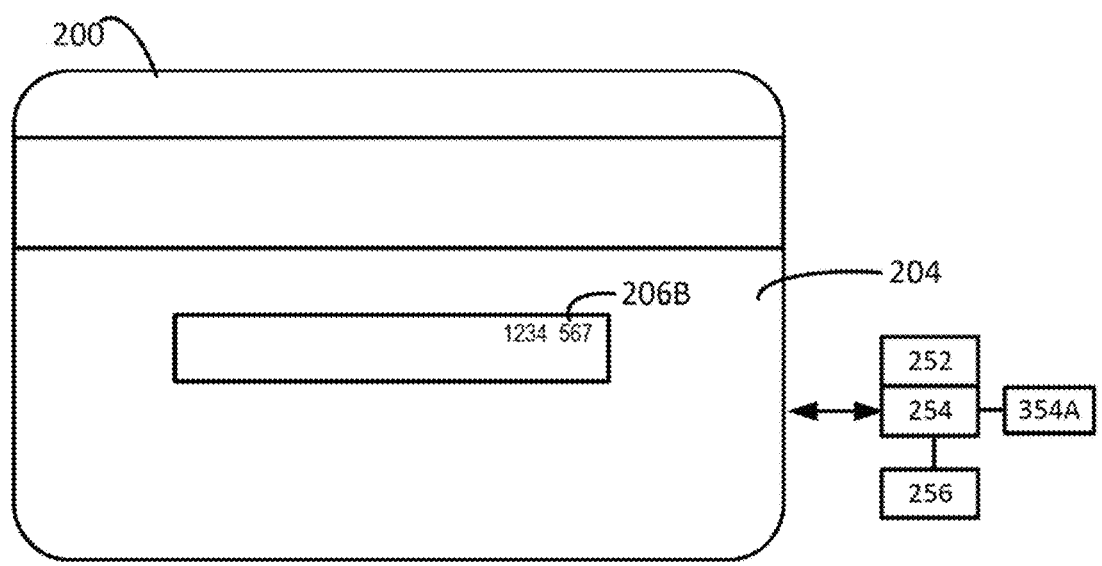
FIG. 2B shows a second view of an exemplary payment device for use with the system of FIG. 1.

With brief reference to FIGS. 2A and 2B, an exemplary payment device 200 may take on a variety of shapes and forms. In some embodiments, the payment device 200 is a traditional card such as a debit card or credit card. In other embodiments, the payment device 200 may be a fob on a key chain, an NFC wearable, or other device. In other embodiments, the payment device 200 may be an electronic wallet where one account from a plurality of accounts previously stored in the wallet is selected and communicated to the system 100 to execute the transaction. As long as the payment device 200 is able to communicate securely with the system 100 and its components, the form of the payment device 200 may not be especially critical and may be a design choice. For example, many legacy payment devices may have to be read by a magnetic stripe reader and thus, the payment device 200 may have to be sized to fit through a magnetic card reader. In other examples, the payment device 200 may communicate through near field communication and the form of the payment device 200 may be virtually any form. Of course, other forms may be possible based on the use of the card, the type of reader being used, etc.

Physically, the payment device 200 may be a card and the card may have a plurality of layers to contain the various elements that make up the payment device 200. In one embodiment, the payment device 200 may have a substantially flat front surface 202 and a substantially flat back surface 204 opposite the front surface 202. Logically, in some embodiments, the surfaces 202, 204 may have some embossments 206 or other forms of legible writing including a personal account number (PAN) 206A and the card verification number (CVN) 206B. In some embodiments, the payment device 200 may include data corresponding to the primary account holder, such as payment network account data 164A for the account holder. A memory 254 generally and a module 254A in particular may be encrypted such that all data related to payment is secure from unwanted third parties. A communication interface 256 may include instructions to facilitate sending payment data 143B, 143A such as a payment payload, a payment token, or other data to identify payment information to one or more components of the system 100 via the network 102.

With reference to FIG. 3, a machine learning (ML) architecture 300 may be used with the weighted price calculation module 112 of system 100 in accordance with the current disclosure. In some embodiments, an AI module 112D of the weighted price calculation system 110 may include instructions for execution on the processor 114 that implement the ML architecture 300. The ML architecture 300 may include an input layer 302, a hidden layer 304, and an output layer 306. The input layer 302 may include inputs 308A, 308B, etc., coupled to the weighted price calculation module 112 and represent those inputs that are observed from actual product, customer, and merchant data in the transaction data 142A, 166A. The hidden layer 304 may include weighted nodes 310 that have been trained for the transactions being observed. Each node 310 of the hidden layer 304 may receive the sum of all inputs 308A, 308B, etc., multiplied by a corresponding weight. The output layer 306 may present various outcomes 312 based on the input values 308A, 308B, etc., and the weighting of the hidden layer 304. Just as a machine learning system for a self-driving car may be trained to determine hazard avoidance actions based on received visual input, the machine learning architecture 300 may be trained to analyze a likely outcome for a given set of inputs based on thousands or even millions of observations of previous customer/merchant transactions. For example, the architecture 300 may be trained to determine pricing data 144 to be associated with the product data 143A.

During training of the machine learning architecture 300, a dataset of inputs may be applied and the weights of the hidden layer 310 may be adjusted for the known outcome (e.g., an actual sale price for a product) associated with that dataset. As more datasets are applied, the weighting accuracy may improve so that the outcome prediction is constantly refined to a more accurate result. In this case, the merchant transaction repository 142 and/or the payment network system repository 166 respectively including transaction data 142A and 166A may provide datasets for initial training and ongoing refining of the machine learning architecture 300.

Additional training of the machine learning architecture 300 may include the an artificial intelligence engine (AI engine) 314 providing additional values to one or more controllable inputs 316 so that outcomes may be observed for particular changes to the transaction data 142A and 166A. The values selected may represent different data types such as selected pricing, time of year, offers, and other alternative data presented at various points in the transaction process with the product data and may be generated at random or by a pseudo-random process. By adding controlled variables to the transaction process, over time, the impact may be measured and fed back into the machine learning architecture 300 weighting to allow capture of an impact on a proposed change to the process in order to optimize the determination of the pricing data 144. Over time, the impact of various different data at different points in the transaction cycle may be used to predict an outcome for a given set of observed values at the inputs layer 302.

After training of the machine learning architecture 300 is completed, data from the hidden layer may be fed to the artificial intelligence engine 314 to generate values for controllable input(s) 316 to optimize the pricing data 144. Similarly, data from the output layer may be fed back into the artificial intelligence engine 314 so that the artificial intelligence engine 314 may, in some embodiments, iterate with different data to determine via the trained machine learning architecture 300, whether the pricing data 144 is accurate, and other determinations.

With reference to FIG. 4, in other embodiments, the machine learning architecture 300 and artificial intelligence engine 314 may include a second instance of a machine learning architecture 400 and/or an additional node layer may be used. In some embodiments, a pricing data identification layer 402 may determine an optimum price 404 from observed inputs 404A, 404B. A transaction identification recommendation layer 406 with outputs 408A, 408B, etc., may be used to generate transaction identification recommendations 410 to an artificial intelligence engine 412, which in turn, may modify one or more of product data generally and the pricing data in particular \when communicating this data via an appropriate SDK.

Figure 5:
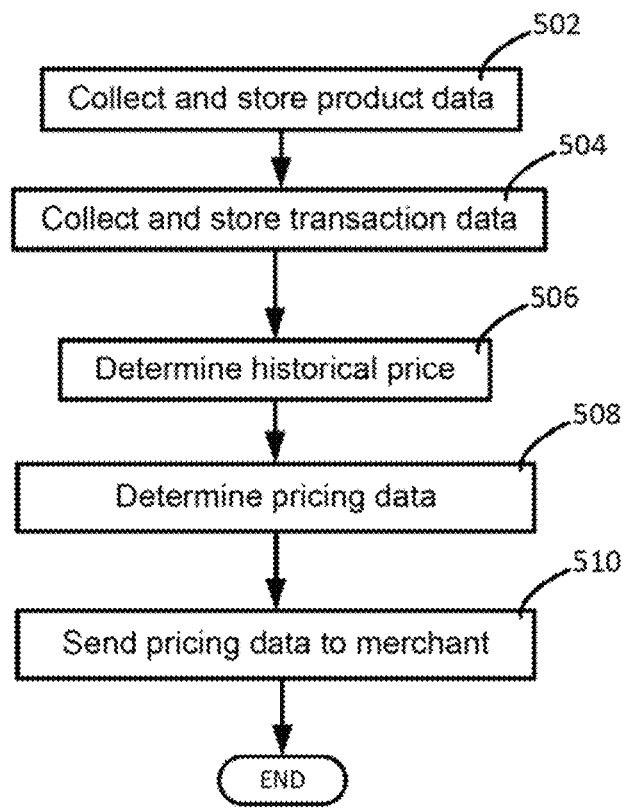
FIG. 5 is a flowchart of a method for determining a real-time optimal price for a product within the system of FIG. 1.

FIG. 5 is a flowchart of a method 500 for determining pricing data 144 for products within an open merchant ecosystem. Each step of the method 500 is one or more computer-executable instructions performed on a server or other computing device which may be physically configured to execute the different aspects of the method. Each step may include execution of any of the instructions as described in relation to the system 100. While the below blocks are presented as an ordered set, the various steps described may be executed in any particular order to complete the real-time optimal pricing methods described herein.

At block 502, the method 500 may execute instructions to collect and store product data 143A. In some embodiments, the product data 143A may be collected and stored by the merchant computer system 106 as part of digital records for various products offered for sale to the user computer system 104 via the network 102. For each product offered by the merchant computer system 106, the product data 143A may include a product name, a product UPC code, an item description, an item category, an item price, a number of units sold at a given price, a merchant ID, a merchant location, a customer location, a calendar week, a date, a historical price of the product, and other information related to the product.

At block 504, the method 500 may execute instructions to collect and store transaction data 142A, 166A. For example, the merchant computer system 106 may collect and store merchant transaction data 142A for each transaction with that particular merchant. The merchant transaction data 142A may correspond to transactions for products with the particular merchant or group of merchants having a merchant profile (e.g., 164B, 164C) at the payment network system 108. The global transaction data 166A may be a cumulative collection of data across all merchants having payment account data 164A with the payment network system 108. The global transaction data 166A may include any data corresponding to a transaction employing the system 100 and a payment device 200 (FIG. 2). For example, the global transaction data 166A may include, for each transaction across a plurality of merchants, data related to a payment or other transaction using a PAN, account identification data, a product name, a product UPC code, an item description, an item category, an item price, a number of units sold at a given price, a merchant ID, a merchant location, a customer location, a calendar week, and a date, corresponding to the product data 143A for the product that was the subject of the transaction.

At block 506, the method 500 may execute instructions to determine a historical price for a product including product data 143A. In some embodiments, the method 500 may mine merchant historical product data 143A and calculate a moving price average until the current date to get historical price of the product.

At block 508, the method 500 may execute instructions to determine pricing data 144. In some embodiments, the method 500 may combine a plurality of metrics from the global transaction data 166A. For example, a pricing data 144 for each product 143A may be determined by the formula described above as EQUATION 1. The global transaction data 166A may be processed at block 506 as a data stream, rather than as a batch process. For example, the method 500 may update the pricing data 144 each time a new transaction is processed for the product by the payment network system 108. This allows the method 500 to determine the pricing data 144 for each item in real time. The method may also employ artificial intelligence and machine learning techniques to improve the pricing data 144. For example, the method 500 may use the historical price for a product from block 506 and as described in relation to FIG. 1 as an input to the machine learning architecture 300. One or more of the coefficients described in relation to EQUATION 1 may be weighted within the hidden layer 304 to arrive at an output of the pricing data 144 from the architecture 300. The architecture 300 may be trained in this way and coupled with the artificial intelligence architecture 400 to arrive at an optimal price for any particular product.

At block 510, the method may cause the pricing data 144 to be sent to a merchant computing system 106 to revise a product price. In some embodiments, the pricing data 144 may be received by the pricing module 152 at the merchant computer system 106. The pricing module 150 may employ one or more of the module 150A, 150B, 150C to apply the pricing data to a product corresponding to product data 143A. In some embodiments, the module 152 executes instructions to apply the pricing data 144 dynamically to the product data 143A. For example, as the number of transactions for the product increases and more transaction data 142A, 166A becomes available to the module 150, the pricing data 144 may more accurately reflect an optimal price for the product. As the pricing data is optimized, the module 152 may automatically apply the pricing data 144 to the corresponding product. Too, a user may configure the system 100 to apply the pricing data only after confirmation or within threshold value boundaries to prevent loss of money on a transaction or give the appearance of price gouging in certain circumstances.

Thus, the present disclosure provides a technical solution to the technical problem of determining optimal pricing data for a product in real time. The systems and methods described herein may analyze historical sales data for the product and determine a real-time optimal price for the item for a present sale. The real-time optimal price may then be passed back to the merchant computer system and used by the merchant to determine a sale price for the item in a present sale.

Figure 6:
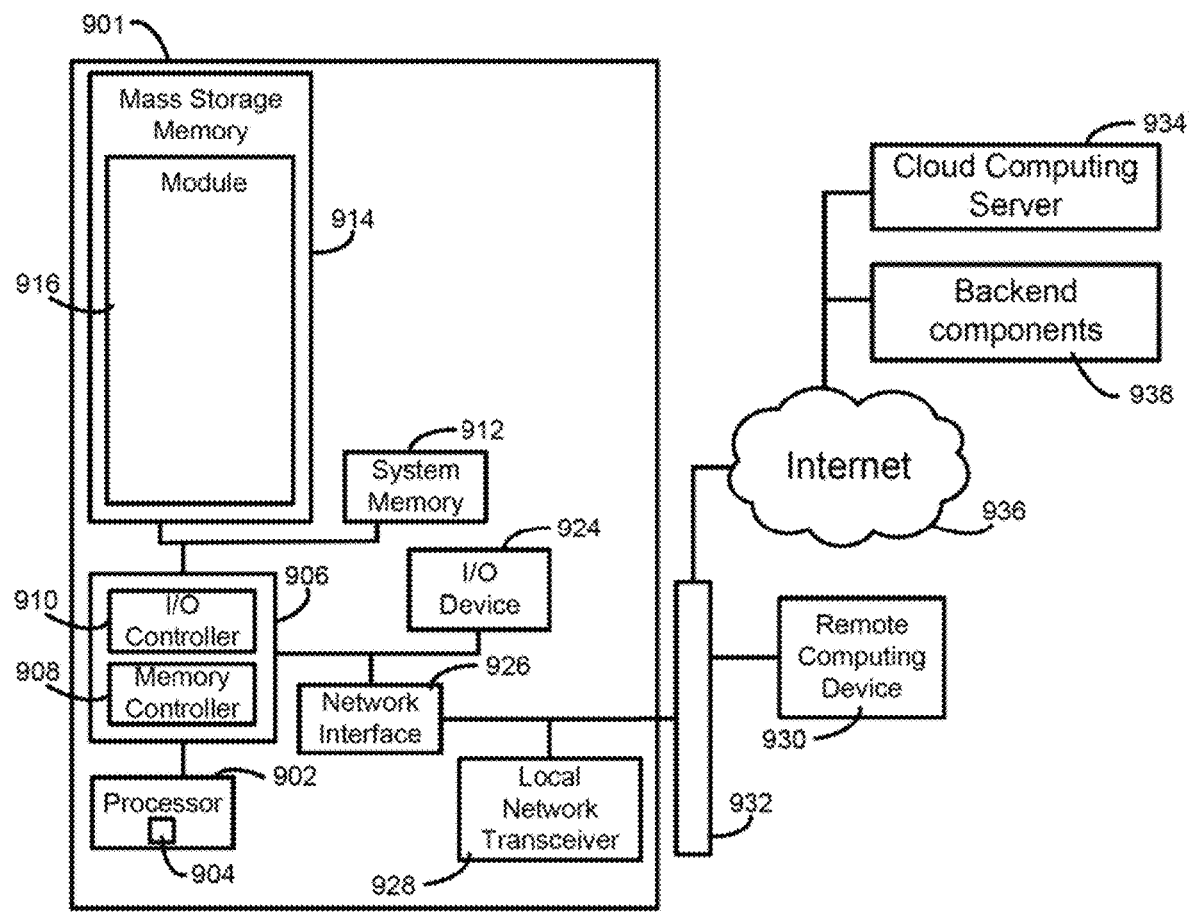
FIG. 6 shows an exemplary computing device that may be physically configured to execute the methods and include the various components described herein.

FIG. 6 is a high-level block diagram of an example computing environment 900 for the system 100 and methods (e.g., method 500) as described herein. The computing device 900 may include a server (e.g., the merchant server 129, payment server 156, weighted price calculation server 116), a mobile computing device (e.g., user computing system 104), a cellular phone, a tablet computer, a Wi-Fi-enabled device or other personal computing device capable of wireless or wired communication), a thin client, or other known type of computing device.

Logically, the various servers may be designed and built to specifically execute certain tasks. For example, the payment server 156 may receive a large amount of data in a short period of time meaning the payment server may contain a special, high speed input output circuit to handle the large amount of data. Similarly, the weighted price calculation server 116 may execute processor intensive machine learning algorithm and thus the server 116 may have increased processing power that is specially adapted to quickly execute the machine learning algorithms. In yet another example, the merchant server 129 may be under less computing strain than the node identification server 116 and may have less processing power than the node identification server.

As will be recognized by one skilled in the art, in light of the disclosure and teachings herein, other types of computing devices can be used that have different architectures. Processor systems similar or identical to the example systems and methods described herein may be used to implement and execute the example systems and methods described herein. Although the example system 100 is described below as including a plurality of peripherals, interfaces, chips, memories, etc., one or more of those elements may be omitted from other example processor systems used to implement and execute the example systems and methods. Also, other components may be added.

As shown in FIG. 6, the computing device 901 includes a processor 902 that is coupled to an interconnection bus. The processor 902 includes a register set or register space 904, which is depicted in FIG. 6 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 6, the computing device 901 may be a multi-processor device and, thus, may include one or more additional processors that are identical or similar to the processor 902 and that are communicatively coupled to the interconnection bus.

The processor 902 of FIG. 6 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 6 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software platforms including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. Moreover, while only one remote computing device 930 is illustrated in FIG. 6 to simplify and clarify the description, it is understood that any number of client computers are supported and can be in communication within the system 900.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method of determining a real-time optimal price for a product, the method comprising:
    in response to receiving global transaction data from a merchant computer system via a computer network, causing a payment network system to store the global transaction data at the payment network system, the global transaction data corresponding to a plurality of purchase transactions for a product corresponding to product data, the product data including an item identification and an item price, the global transaction data corresponding to purchase transactions between a plurality of customer computer systems and a plurality of merchant computer systems for the product, and each purchase transaction including an item sale price and a merchant identifier;
    determining pricing data from a combination of coefficients corresponding to the product data and the global transaction data at a weighted price calculation system upon storing the global transaction data at the payment network system; and
    sending a control communication to a pricing module of the merchant computer system of the plurality of merchant computer systems upon determining pricing data from the combination of coefficients corresponding to the product data and the global transaction data, the control signal for revising the item price for the product at the merchant computer system based on the pricing data.

2. The method of claim 1, wherein the product data and the global transaction data includes one or more of a product name, a product UPC code, an item description, an item category, a number of units sold at a given price, a merchant ID, a merchant location, a customer location, a calendar week, a date, and a historical price of the product.

3. The method of claim 2, wherein the historical price of the product includes a moving price average for the product.

4. The method of claim 3, further comprising mining the global transaction data to a current transaction date to calculate the moving price average.

5. The method of claim 4, wherein the combination of coefficients corresponding to the product data and the global transaction data includes a weighted sale price, a historical coefficient, a similar price category coefficient, a seasonality coefficient a sales velocity coefficient, and an accuracy coefficient.

6. The method of claim 5, wherein the combination of coefficients corresponding to the product data and the global transaction data does not include sales volume for the product.

7. The method of claim 6, wherein mining the global transaction data to the current transaction date to calculate the moving price average includes processing each global transaction data corresponding to the product in real time.

8. The method of claim 7, wherein determining pricing data from the combination of coefficients corresponding to the product data and the global transaction data includes processing the global transaction data as a data stream and not as a batch.

9. The method of claim 8, wherein the similar price category coefficient includes a numerical value representing a similarity of the product to other products corresponding to the global transaction data.

10. The method of claim 9, further comprising determining the similar price category coefficient from a natural language analysis of the item description for a plurality of products from the global transaction data.

11. A system for determining a real-time optimal price for a product comprising:
    a processor and memory hosting an weighted price calculation system; and
    a database communicably coupled to the processor and the memory, the database storing global transaction data corresponding to a plurality of purchase transactions for a product corresponding to product data, the product data including an item identification and an item price, the global transaction data corresponding to purchase transactions between a plurality of customer computer systems and a plurality of merchant computer systems for the product, and each purchase transaction including an item sale price and a merchant identifier;
    wherein the memory includes instructions that are executable by the processor for:
        determining pricing data from a combination of coefficients corresponding to the product data and the global transaction data at the weighted price calculation system upon storing the global transaction data at the payment network system; and sending a control communication to a pricing module of a merchant computer system of the plurality of merchant computer systems upon determining pricing data from the combination of coefficients corresponding to the product data and the global transaction data, the control signal for revising the item price for the product at the merchant computer system based on the pricing data.

12. The system of claim 11, wherein the product data and the global transaction data includes an item price and one or more of a product name, a product UPC code, an item description, an item category, a number of units sold at a given price, a merchant ID, a merchant location, a customer location, a calendar week, a date, and a historical price of the product.

13. The system of claim 12, wherein the historical price of the product includes a moving price average for the product.

14. The system of claim 13, further comprising instructions for mining the global transaction data to a current transaction date to calculate the moving price average.

15. The system of claim 14, wherein the combination of coefficients corresponding to the product data and the global transaction data includes a weighted sale price, a historical coefficient, a similar price category coefficient, a seasonality coefficient a sales velocity coefficient, and an accuracy coefficient.

16. The system of claim 15, wherein the combination of coefficients corresponding to the product data and the global transaction data does not include sales volume for the product.

17. The system of claim 16, wherein the instructions for mining the global transaction data to the current transaction date to calculate the moving price average includes processing each global transaction data corresponding to the product in real time.

18. The system of claim 17, wherein the instructions for determining pricing data from the combination of coefficients corresponding to the product data and the global transaction data includes processing the global transaction data as a data stream and not as a batch.

19. The system of claim 18, wherein the similar price category coefficient includes a numerical value representing similarity of the product to other products corresponding to the global transaction data.

20. The system of claim 19, further comprising an instruction for determining the similar price category coefficient from a natural language analysis of an item description for a plurality of products from the global transaction data.

* * * * *